United States Patent [19]

Harpster

[11] Patent Number: 4,942,763
[45] Date of Patent: Jul. 24, 1990

[54] FLOW SENSOR ASSEMBLY

[76] Inventor: Joseph W. Harpster, 11450 Overbrook Ln., Galena, Ohio 43021

[21] Appl. No.: 172,030

[22] Filed: Mar. 23, 1988

[51] Int. Cl.$^5$ .............................................. G01F 5/00
[52] U.S. Cl. ..................................... 73/202.5; 73/195; 73/198
[58] Field of Search ................. 73/189, 198, 202, 204, 73/861.83, 861.92, 204.21, 204.22, 204.25, 204.27, 202.5

[56] References Cited

U.S. PATENT DOCUMENTS

| | | | |
|---|---|---|---|
| 2,299,406 | 10/1942 | Potter | 73/861.92 |
| 3,768,308 | 10/1973 | Neradka | 73/189 |
| 4,177,676 | 12/1979 | Welker | 73/198 |
| 4,280,360 | 7/1981 | Kobayashi et al. | 73/198 |
| 4,326,412 | 4/1982 | Kobayashi et al. | 73/204 |
| 4,495,802 | 1/1985 | Kashiwaya et al. | 73/204 |
| 4,578,996 | 4/1986 | Abe et al. | 73/204 |
| 4,581,930 | 4/1986 | Komons | 73/204.22 |
| 4,599,895 | 7/1986 | Wiseman | 73/204 |

Primary Examiner—Herbert Goldstein
Attorney, Agent, or Firm—Mueller and Smith

[57] ABSTRACT

A flow sensor assembly particularly suited for measuring localized flow components within a region of flow which may exhibit flow components of varying velocity vector in both intensities and directions. The assembly includes a sampling conduit which confronts the localized flow and, through an entrance partitioning arrangement, develops a sampling flow therethrough representing the product of the cosine of the angle of incidence of the intercepted flow with the axis of the sensing channel. A flow sensor is positioned within the sampling flow to provide a readout of the velocity thereof. The apparatus can be mounted on a movable probe and employed to determine the intensity and direct of localized fluid flow components within larger regions of flow.

36 Claims, 5 Drawing Sheets

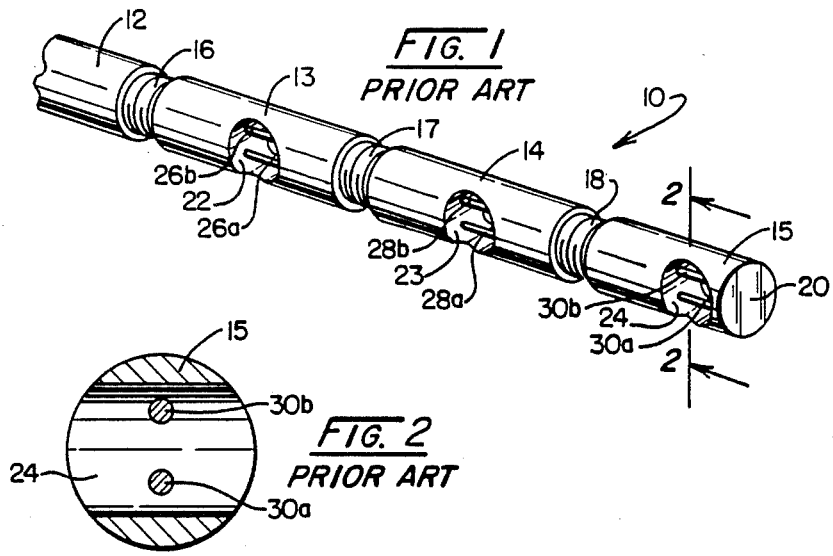
FIG. 1 PRIOR ART
FIG. 2 PRIOR ART
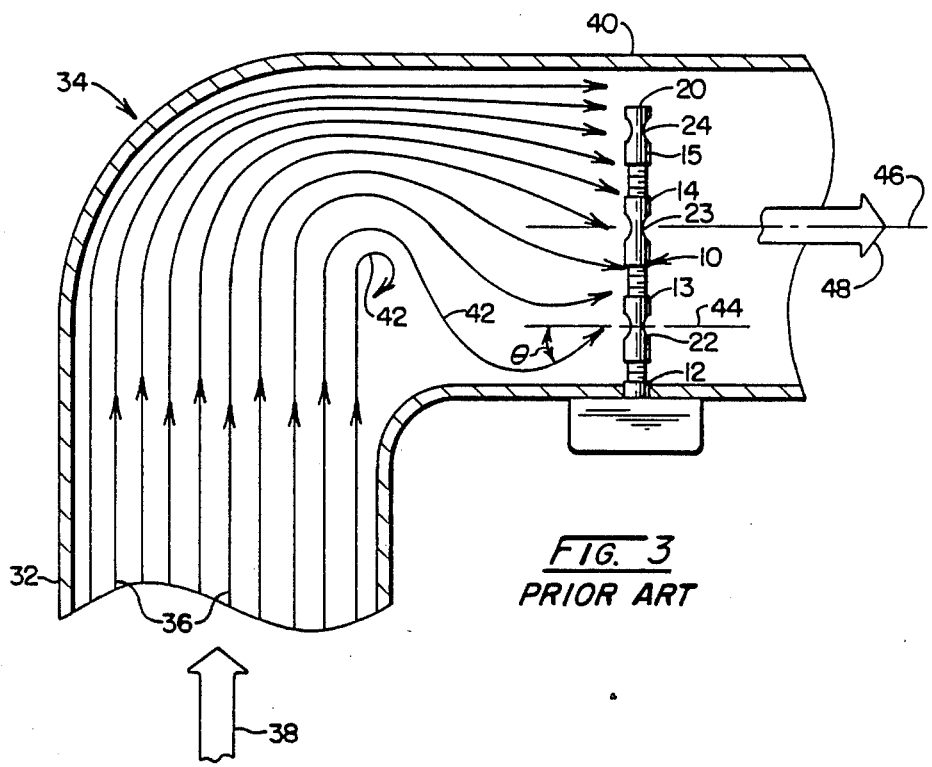
FIG. 3 PRIOR ART

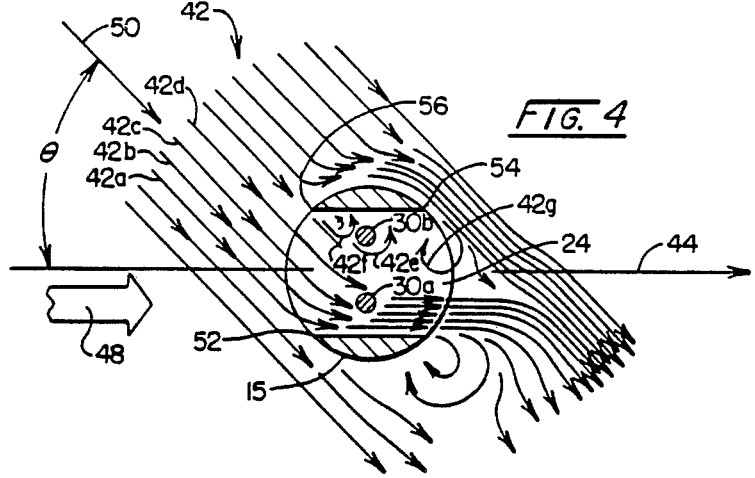
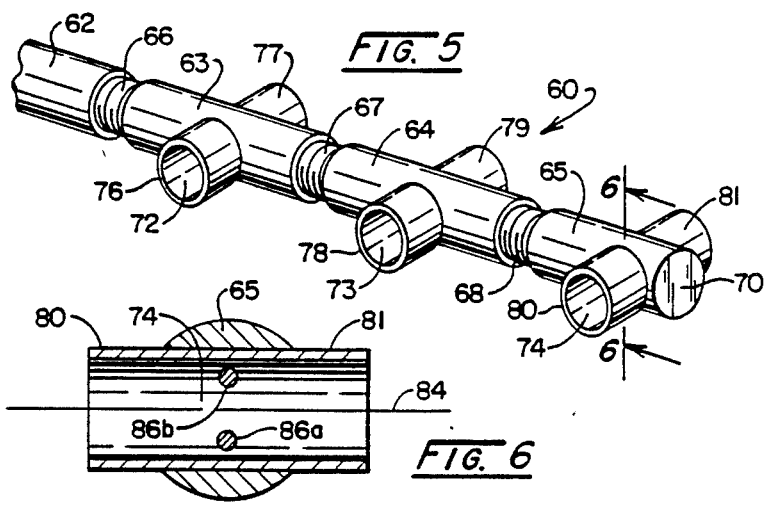
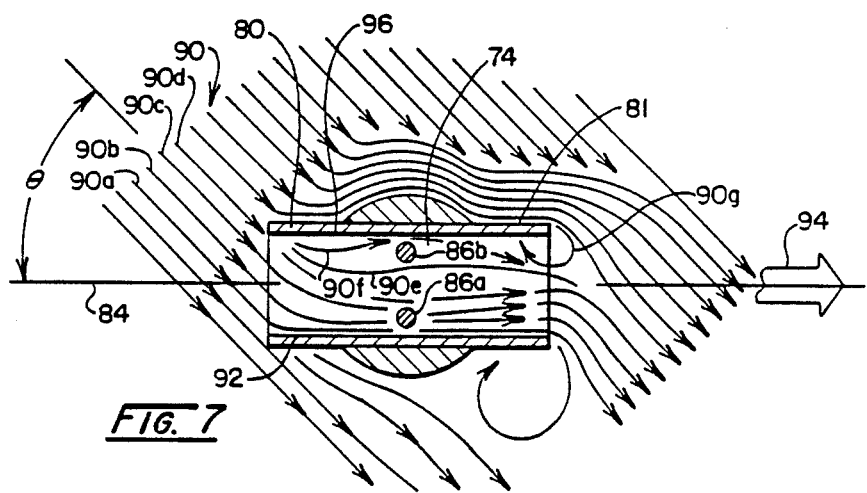

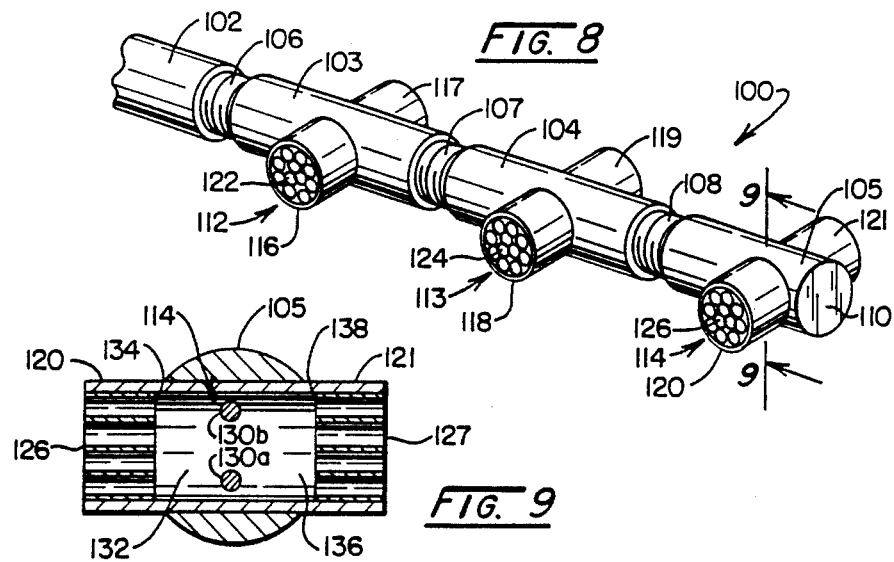
FIG. 8
FIG. 9
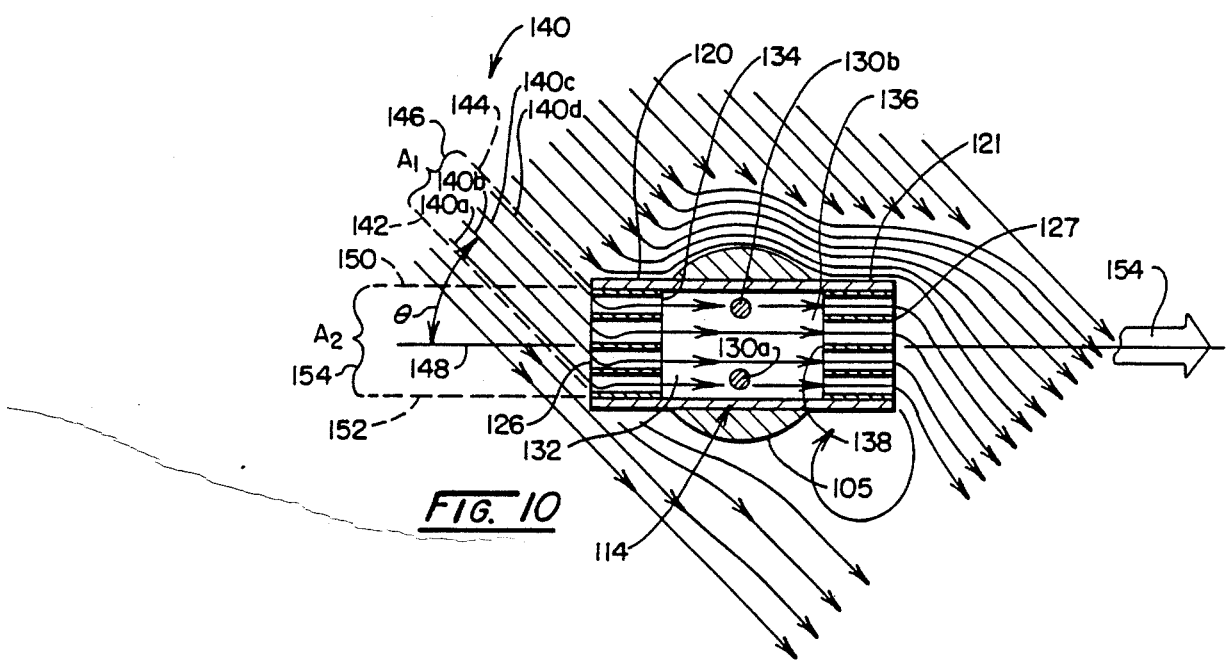
FIG. 10

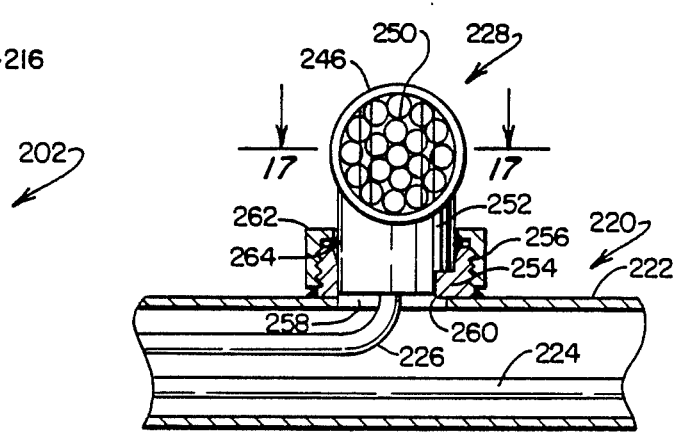
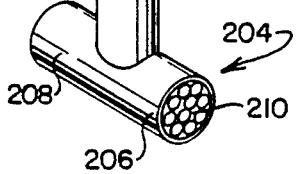
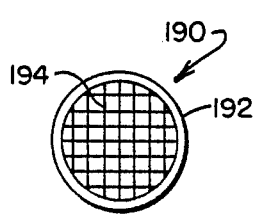
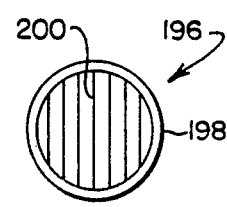

FLOW SENSOR ASSEMBLY

BACKGROUND OF THE INVENTION

A broad variety of industries ranging from those engaged in chemical production to power generating plants utilize gas or fluid transporting ducts or pipes to manipulate fluid masses or material along various process locations. For example, furnace installations may be employed to burn-off poisonous or corrosive gases. For such applications, regulatory agencies may require measurement of the true amount of air, fuel, and hazardous gas entering the furnace, as well as that being removed through the stack such that the operator may carry out a mass balancing form of operation. The size of ducts and stacks carrying these gases may be quite large, for instance up to 60 inches in diameter or the rectangular equivalent thereof. Movement of gases through such ducts will be effected by any of a broad range of dynamics including fans, flow direction changing components, dampers, restrictors, and the like, and the overall gas flow across any given duct section is one exhibiting what may become a range of gas flow directions having various velocity vectors which are manifested by such phenomena as swirls, local turbulences, and the like. Generally, straight runs of such ducting with aspect ratios serving to permit flow characterizations are seldom available to permit facile mass flow measurement. Some power plant installations require that a study or correlation be carried out between gas movement and filter particulate material collection, an endeavor referred to as isokinetic measurement. To be accurate, such measurements must also be carried out with reliable evaluations of actual mass transport, even though the gas transfer at hand cannot be accurately characterized. Measurements of mass transport of gaseous materials also may be required at the commencement of a given process. For example, hoods collecting hazardous chemical vapors typically incorporate a fan and duct arrangement within which sensors must be placed to accurately measure gas flow, thus assuring at least a minimum of gas transport to protect personnel working in adjacent plant regions. Because of the dynamics of such fans and the use of flow direction changing elbows, dampers and the like, the overall gas flow across any given duct section for the hoods is one exhibiting the noted range of gas flow directions or variations of flow velocity vectors manifesting an overall flow pattern which cannot be characterized.

The technique of carrying out gas flow measurement for such applications as discussed above typically looks to the use of a series of small flow rate sensors positioned strategically across a duct cross section. The type sensor employed for such localized measurement may vary. In this regard, flow sensors are available as small turbine meters, strain bars (target meters), pitot tubes, thermal probes, and the like, all measuring flow rate by detecting local fluid speed. Because of the noted variations of fluid flow directions or velocity vectors, these localized sensors have exhibited unacceptable inaccuracies which, in turn, are manifested in inaccurate mass transport or flow averaging computations otherwise revealing true movement of material along a duct. Calibration of these flow measuring instruments or calibration checking, requires establishing a conduit system having long, straight runs upstream and downstream of the sensor or probe to establish a steady and characterized flow profile. The calibrating conduit may also be provided with flow straighteners to establish flow profile, thus reducing required run length. Flow straighteners generally are configured as a grouping of partitions (e.g. a tube bundle) arranged to break-up the duct into smaller, parallel duct channels so that the pressure drop across each channel location of the straightener is made more uniform than it may have been without the straightener. The straightener is, therefore, a flow resistor with each section having a high "aspect ratio", i.e. conduit axial direction (length) to "width" or diameter ratio, e.g. 20:1. The result of such calibration is to achieve accuracy only when the flow sensors are subjected to a characterized fluid velocity axially aligned with the conduit within which they are positioned and, correspondingly, in alignment with the flow axis of the sensor iself. Output flow signals generated by the sensors when employed in determining mass transport, can deviate strongly from that obtained during the noted calibration if the fluid flow direction incident at the localized position of the sensor is off axis with respect to the axis of the sensor. The thus-measured signal can be much greater or much less than the conduit axial component of fluid velocity which, in turn, well may lead to gross error in fluid flow measurement.

A generally unrecognized limitation of these sensors is concerned with their failure to accommodate to fluid flow velocity vectors not parallel with their axes of flow confrontation. The output signals of the devices do not respond to an expected cosine distribution, or have a flat response to speed of fluid gas flow as a function of the noted incident angle where that angle varies from the axis of the sensor. In this regard, thermal sensors generally employ a two probe configuration, one probe serving to house a temperature sensor to sense the fluid temperature providing a signal reference. The second probe is electrically heated and contains a temperature sensor in close physical contact with the heater (or such components may be combined as one element) and operates at a temperature higher than that of the reference signal probe. This heated probe provides a flow velocity sensitive signal since its temperature varies with fluid velocity, or its measured power if its structure is such as to maintain a temperature differential between the two probes. Incident flow velocity vectors varying from the axis of such a probe engender inaccuracies resulting in unreliable sensing outputs. This phenomena heretofore has been unrecognized or, at best, ignored.

The inability of individual flow sensors to respond to what is, in effect, the cosine of the velocity vector of flow impinging upon them can represent a dramatic limitation in accuracy where several such sensors are spaced in large diameter conduits to perform flow averaging. For such large diameter conduits, it is necessary to have several points in an approximate plane perpendicular to the direction of the conduit axis for carrying out measurement of local velocities. Flow averaging is particularly necessitated if the flow profile for the large duct is not characterized as "fully developed" as is generally the case. Such conditions have common causes notwithstanding duct size, including the noted flow path elbows, sideline intersections, control valves or the like. Heretofore, it has been common practice where an independent measurement shows sensed and averaged flow to be excessively high or low to simply correct the output signal of the flow sensor array to obtain agreement with the known value. This approach represents an unwise procedure more than likely leading to further unreliable measurement.

These alignment limitations of flow sensors also constitute limitations to the use of such sensors as probes to find the actual velocity vector of fluid flow in other applications. For example, it is very often desirable to map fluid flow velocity vectors in such industrial installations as very large chimneys or huge dryers having diameters of 20 feet or more. The latter devices, for instance, are designed to achieve a swirling gas motion to the extent that it is possible for gases along the outside walls of the devices to be rising while those gases at the center are moving downwardly. Often it is desirable to be able to measure the flow profile of the gases in such devices. Where the fluid flow sensors employed for this probing procedure are inaccurate for any off axis incident gas velocity vectors, their use is questionable for such flow vector mapping purposes.

Where an array of flow sensors is employed across a larger duct to measure flow, the current practice for mounting them looks to the use of threaded fittings or weldaments to mount the sensors on a single insertion rod. Very often, the thus-mounted sensors are damaged. For example, where turbine meters are employd, the delicate rotating vanes may become damaged. Similarly, the exposed probes of thermal type sensors may become bent so as to damage the temperature sensors and heater elements contained therein. In some instances, sensors of the thermal type are housed in a sequence of integrated shrouds to obtain probe protection. To carry out necessary repairs of any given one of the probe sensors, the entire array necessarily is removed from the duct installation and the process for correction becomes arduous, involved, and costly.

SUMMARY

The present invention is addressed to an improved flow sensing apparatus and method in which localized components of fluid flow may be accurately evaluated. Flow component sampling conduits are employed with flow sensors such as thermal probes or those above-discussed in a manner wherein flow velocity values are obtained which accurately represent a cosine valuation of the instant vector of local flow velocity. Thus, accurate flow mass transport measurements can be carried out employing an array of such flow evaluation assemblages. Further, the flow sampling technique may be employed with probe structures to determine the direction and speed of localized flow components within a larger region of fluid flow.

As another particular aspect, the invention provides apparatus for determining the mass transport of fluid within a conduit, the fluid having a mass transport vector along the axis of the conduit, the mass transport vector being derived from localized components of fluid flow each exhibiting a local flow velocity vector. The apparatus includes a sampling conduit having a flow axis, positioned within the conduit and having an entrance opening of area extent selected to confront and sample an incident front area of fluid representing a localized component of fluid flow and that component of fluid flow exhibiting a local flow velocity vector incident to the flow axis at an angle $\theta$, for admitting that portion of the component as sampled fluid flow. An entrance partitioner arrangement is provided which is comprised of a plurality of conduits positioned within the sampling conduit, each having a principal cross-sectional dimension and extending therein a predetermined length to an end location, the predetermined length being selected as a multiple of the principal dimension effective to intercept discrete portions of the component of fluid flow and alter the direction of flow thereof to a direction substantially parallel with the sampling conduit flow axis and exhibiting a velocity substantially corresponding with the product of the local flow velocity vector and the cosine of the angle $\theta$.

A flow sensor is mounted with the sampling conduit and is responsive to the sampled fluid flow for deriving an output signal corresponding therewith. An arrangement defining a flow chamber intermediate the flow sensor and the entrance partitioner end location is provided for effecting the derivation of a substantially uniform profile of velocity of the sampled fluid flow at each flow sensor.

Another particular aspect of the invention provides a flow sensor apparatus which is positionable within a conduit carrying fluid moving therewithin along a mass transport axis and exhibiting localized commponents of flow having velocity vectors at angles $\theta$, incident to the transport axis. The apparatus includes a sampling conduit having an entrance opening of area extent selected to confront a localized component of flow and further includes a sampling channel defining a flow axis parallel with the transport axis extending to an exit opening and configured for developing a sample flow at a predetermined location within the sampling channel which has a flow velocity corresponding with the product of the localized component velocity vector incident upon the entrance opening and the cosine of its incident angle $\theta$. An entrance partitioner is positioned within the sampling channel which has a plurality of conduits, each having a principal cross-sectional dimension and each extending a predetermined length selected as a multiple of the noted principal dimension effective to intercept discrete portions of the localized component of flow and alter the direction thereof to a direction substantially parallel with the flow axis and exhibiting a flow velocity corresponding with the product of the localized fluid component velocity vector incident upon the entrance opening and the cosine of its angle $\theta$. A flow sensor is positioned within the sampling channel at the predetermined location and is responsive to the fluid sample flow thereat for deriving a output signal corresponding therewith.

Another particular aspect of the invention provides a method for determining the mass transport of fluid flowing within a conduit and having a mass transport vector along the axis of the conduit, the mass transport vector being derived from localized components of fluid flow, each exhibiting a local flow velocity vector at an angle $\theta$ with respect to the conduit axis. The method includes the steps of:

providing a sampling conduit having an entrance opening of area extent selected to confront and define a said localized component of the localized fluid flow exhibiting substantially uniform flow velocity, and having a sampling channel extending along a channel axis from the entrance opening to an exit opening;

positioning the sampling conduit to intercept localized fluid flow and in an orientation wherein the channel axis is parallel with the conduit axis;

partitioning the intercepted fluid flow upon the entry thereof through the entrance opening by locating a plurality of partitioning conduits within said sampling conduit, each said conduit having a principal cross-sectional dimension and intercepting a discrete portion of said intercepted fluid flow and each conduit extending from said entrance opening to an end location representing a length selected as a multiple of said principal dimension effective to derive a fluid flow exhibiting a flow vector substantially parallel with said sampling axis and having a sampled flow velocity vector of magnitude corresponding with the product of the localized flow velocity vector and the cosine of the angle $\theta$;

positioning a flow sensor within the sampling channel at a location to measure the fluid flow having the sampled flow velocity vector, said location being spaced from said end location of said partitioning conduits to define a flow chamber of extent deriving a substantially uniform profile of velocity of said intercepted fluid flow at said flow sensor; and deriving a flow velocity output from the positioned flow sensor.

Another particular aspect of the invention is to provide apparatus for detecting the direction of a localized component of fluid flow within a region of movement of such fluid. The apparatus includes a positioning rod having an end positionable within the region of fluid movement. A sampling conduit and entrance partitioner as above described further are provided. A flow sensor is positioned within the sampling channel at the predetermined location and is responsive to the fluid sample flow thereat for deriving an output signal corresponding therewith and a manipulator is provided for effecting the movement of the positioning rod to maneuver the sampling conduit into a position wherein the value of the detected cosine of the incident angle approaches unity and for determining the orientation of the vector of the flow velocity at such position.

Another particular aspect of the invention provides a flow sensor assembly for positioning within a region of fluid flow which includes a sensor support mountable within the region of fluid flow, having an external surface, an internally disposed conduit extending along a support axis for protectively supporting electrical leads and a selectively positioned conduit opening communicating with the conduit through the noted surface. An annular, externally threaded mount having a base fixed to a support external surface, a top surface, a centrally disposed cylindrical surface opening extending from the top surface therethrough and the mount is positioned over the conduit opening. A cylindrical sampling conduit support is slideably insertable within the mount cylindrical surface opening and is supportable therefrom and has an internally disposed channel for effecting access with the sensor support conduit through the conduit opening. A sampling conduit is provided for sampling a localized component of fluid flow along a sampling flow axis, the sampling conduit being mounted upon and supported by the cylindrical sampling conduit support. A flow sensor is mounted within the sampling conduit and is responsive to the sampled fluid flow for deriving an output signal corresponding therewith at electrical output leads extensible through the internally disposed channel and sensor support internally disposed conduit for readout access without the region of fluid flow. A compliant sealing material is positioned at the mount top surface in contact with the cylindrical contact support, and an annular, internally threaded retainer cap is threadably engageable with the externally threaded mount and is slidably positionable about the cylindrical sampling conduit support for effecting the retention thereof within the annular mount by compressible engagement with the compliant sealing material.

Other objects and features of the invention will, in part, be obvious and will, in part appear hereinafter. The invention, accordingly, comprises the method and apparatus possessing the construction, combination of elements, arrangement of parts, and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a partial perspective view of an array of flow sensors as taught by the prior art;

FIG. 2 is a partial sectional view of the array shown in FIG. 1 taken through the plane 2—2 shown therein;

FIG. 3 is a partial sectional view of a duct employing the array of FIG. 1 and schematically portraying flow vector;

FIG. 4 is a sectional view of the sensor arrangement of FIG. 2 showing flow vectors incident thereon;

FIG. 5 is a sensor array similar to that shown in FIG. 1 but with shroud extenders associated therewith;

FIG. 6 is a partial sectional view of one sensor employed with the array of FIG. 5;

FIG. 7 is a portrayal of the sensor structure of FIG. 6 in conjunction with flow vector;

FIG. 8 is a sensor array embodiment according to the instant invention;

FIG. 9 is a sectional view of the array at FIG. 8 taken through the plane 9—9 shown therein;

FIG. 10 is a view of the sensor of FIG. 9 in conjunction with flow vectors incident thereon;

FIG. 13 shows an alternate embodiment for a partitioning arrangement employed with the instant invention;

FIG. 14 reveals another partitioning arrangement which may be employed with the sensor of the invention;

FIG. 15 is a perspective representation of a hand-held velocity direction probe embodiment of the instant invention;

FIG. 16 is a partial sectional view of the mounting arrangement for the sensor of the invention; and FIG. 17 is a sectional view of the sensor shown in FIG. 16 taken through the plane 17—17 thereof.

DETAILED DESCRIPTION

Figure 11:
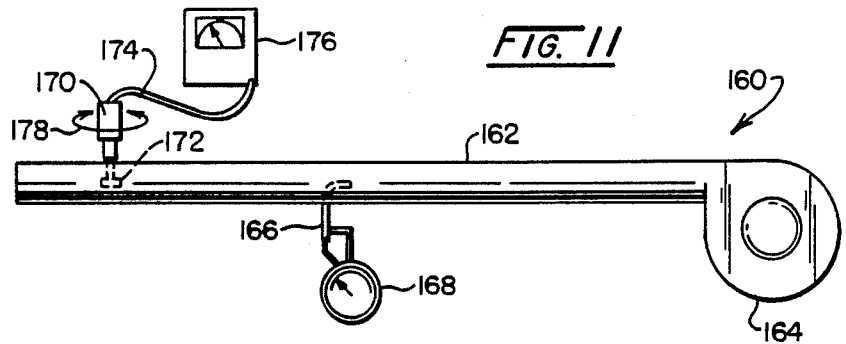
FIG. 11 is a schematic portrayal of a test arrangement.

The measure of mass transport in larger fluid conveyancing devices such as ducts and the like typically has been carried out through the positioning of a sequence of flow sensors across strategic portions of such ducting. Referring to FIG. 1, an array of flow sensors as are used in such installations is represented generally at 10. The array 10 may be seen to be structured as a mounting tube 12 and a sequence of tubular sensor supports as at 13–15 which are coupled together in serial fashion by respective threaded connections represented at 16–18. The end sensor support 15 is plugged by an end wall 20 and appropriate electrical leads and the like extend from mounting tube 12 at the opposite side of the array. Each of the sensor support components 13-15 is bored to define open cylindrically shaped cavities respectively shown at 22-24. Thus, the cavities will intercept impinging fluid flow in the duct within which the array 10 is mounted. Each of these cavities as at 22-24 is arranged to support flow sensing implements herein embodied as dual sensing probes extending across the cavities 22-24. In this regard, probes 26a and 26b are shown within cavity 22; probes 28a-28b are shown mounted within cavity 23, and probes 30a-30b are shown mounted across cavity 24 within array component 15.

Referring to FIG. 2, the arrangement of probes 30a and 30b within cavity 24 is illustrated in enhanced detail. Generally, these probes perform in the manner described in above-noted U.S. Pat. No. 4,255,968. In their basic concept, the fluid sensor arrangement represented by probes 30a and 30b provides for the removal of heat generated by a small heater located in one designated probe, i.e. probe 30a across which fluid is flowing. The heater is in thermal communication with this flowing material and the conductance property of heat flow from the probe 30a increases as material flow is increased, causing a lowering of temperature of both the heater contained therein and its immediate surroundings. A measure of the temperature differential between regions thermally remote from and near the heater probe 30a as developed with reference to probe 30b provides a calibratable signal, the value of which is in relation to flow. For example, Letting $T_0(v=0)$ represent the temperature differential between the heated and unheated temperature sensors 30a and 30b, for zero stream velocity and letting $T(v)$ be the temperature differential between the two sensors for a stream velocity of v, then the difference between these two values, T, is relatable to flow through the relationship:

$$T = T_0(v=0) - T(v) = C_1 Fctn(v)$$

where $C_1$ is an empirical constant.

The use of an array of sensors as at 10 in FIG. 1 has been deemed necessary inasmuch as values for flow velocities across a region of flow within a duct may vary from installation to installation. What is desired as the sensed information is the value of mass transport of fluid and thus, it is the practice to simply average the readings from each of the sensing element as at 13-15. Unfortunately, this procedure has led to flow measurement error.

Referring to FIG. 3, a demonstration of an installation of arrays as 10 is provided. Here, a straight section of duct or pipe having a relatively large cross-sectional area is shown approaching an elbow or bend as represented generally at 34. The fluid flowing within the straight section 32 of the duct is represented by an array of local flow velocity vectors as at 36 which are seen and shown for demonstration purposes only, to be somewhat uniformly disposed representing a uniformly distributed or "fully developed" profile of fluid flow having a mass transport characteristic or vector as represented by larger arrow 38 which is seen to be aligned with the central axis of the duct portion 32. Usually, this form of uniform distribution of flow will have occurred following a relatively lengthy straight run of ducting or somewhat following a flow straightener. However, as the elbow or bend 34 is encountered by this uniform flow, the uniformity thereof is disrupted as the flow then enters the next section of duct represented at 40. The vectors 36 now represent a perturbation of the otherwise uniform flow such that localized components of the flow as at 42 exhibit broad variations of flow vectors. Note, in this regard, that the localized flow component as at 42 impinging upon cavity 24 of array 10 is approaching the sensor cavity 22 at an angle, $\theta$, with respect to its centralized axis 44. While axis 44 is aligned with the central axis 46 of duct component 40, without more, the sensor components will not measure a flow velocity characteristic which is representative of the desired component of mass transport now depicted by larger arrow 48, i.e. a simple averaging of inaccurately sensed flow vectors will not result in a determination of the true value of mass transport represented by arrow 48.

Looking to FIG. 4, the cavity 24 of array 10 again is reproduced as shown in FIG. 2, however, in conjunction with a vector of fluid flow of the grouping thereof 42 shown in FIG. 3, for example, emanating from above the sensing unit and impinging downwardly thereon in an off axis orientation represented by the new angle $\theta$ extending between a local velocity vector line represented at 50 and axis 44. The mass transport vector again is represented by arrow 48 and illustrates the overall flow component evaluation which is desired by the array of sensors. The inaccuracy of the sensed fluid flow provided through cavity 24 is represented in the figure by discrete flow vectors 42a-42d which are seen to impinge upon the surface 52 of cavity 24 in the vicinity of the heated probe 30a. This causes a build-up of velocity value for the flow in the immediate region of the heated sensor 30a to the extent that heat energy is removed therefrom at a level of higher conductance than that representing the true flow of mass along the axis 44 of the measuring device, as well as in consonance with the direction of the mass transport vector represented at arrow 48. The measurement of fluid temperature by reference probe 30b, however, remains substantially unchanged, a swirling turbulence of more minor import surrounding it as depicted by vectors 42e-42g, having little consequence on its sensed temperature. The evaluation for fluid flow through the sensing component incorporated within cavity 24 is in error due to the heated probe environment, in effect, not representing a fluid flow vector corresponding with the cosine of the angle $\theta$.

Another phenomenon may be observed with respect to the flow of fluid through cavity 24. As fluid passes around the external surface of the shroud or support 15, a turbulence will occur at the exit side thereof as represented by vector 42g. This turbulence will create what in effect may be considered a back flow to hinder the accuracy of any fluid flow measurement carried out by the probe structures 30a-30b.

As a correction of the "pile-up" of fluid against surface 52, the removal of the constraints or shrouding effect of the sensor support 15 may be contemplated. For example, should the surface 52 be moved outwardly so far as to avoid the instant fluid concentration and resultant mass velocity increase in the region of the heated probe 30a alone, then, the reading will remain substantially the same notwithstanding the angle $\theta$ of the impinging fluid and the resultant computation for mass transport as represented at large arrow 48 again becomes inaccurate and unacceptable.

Now considering a reversal of the roles of probes 30a and 30b, and designating that the heated probe now becomes probe 30b and the reference probe is that at 30a, the same fluid conditions obtain as described above in conjunction with vectors 42a–42d. Additionally, it may be seen that the heated probe now is shielded by a surface 54 such that only minimal heat energy conductance is effected by the fluid flow across it. Thus, the probe 30b will report a fluid flow much less than that actually represented by flow along that vector representing the cosine of $\theta$. As the latter angle $\theta$ becomes more shallow, perturbations commence to occur at the edge 56 of surface 54 causing a swirling turbulence in the region of the probe 30b as represented by flow vectors 42e–42f. This swirling has been observed to contribute to an error in velocity measurement wherein the velocity measured is in excess of that actually representing mass transport of fluid as well as for an unobstructed probe should the shroud 54 be removed. Thus, inaccuracies are generated by conventional systems notwithstanding the angle of attack or incidence of the confronting fluid.

Looking again to FIG. 1, one approach considered in alleviating the inaccuracies inherent in the sensor array 10 performance has been to extend the shroud surrounding the sensors as represented by cavities 22–24 such that the flow of fluid within the local fluid front at the probes being evaluated becomes uniform. Assuming adequate performance, in order for such an arrangement to be practical, the shroud extenders should be of relatively short length in most applications. Looking to FIG. 5, a sensor array 60 is represented again including a cylindrical base support 62 and sensor supports 63–65. As before these discrete supports 62–65 are threadably interconnected at respective couplings 66–68 and the end support 65 is shown plugged by an end surface 70. Cavities as at 72–74 are formed, as before, within each of the respective supports 63–65 and each such cavity includes a pair of sensing probes as discussed above, for example, at 30a–30b. In this embodiment, however, each such cavity includes a cylindrical shroud extender portion. In this regard, cavity 72 incorporates extender portion 76 and 77, cavity 73 incorporates extender portions 78 and 79, and cavity 74 incorporates extender portions 80 and 81. These extender portions 76–81, although not necessary, are seen to have a cylindrical shape, the central axes of which are aligned with the central axes of the cavities 72–74. For example, looking to FIG. 6, cavity 74 within support 65 is represented at an enhanced level of detail. The cavity 74 is shown having a centrally disposed flow axis 84 and incorporates probes 86a and 86b. Note that the cylindrical shroud extender portions 80 and 81, for example, are of a length which would be considered convenient and practical for use in a typical duct analyzing installation. However, referring to FIG. 7, where such shrouds are employed within a localized or incident front and the shroud is not of extended length, for example a length corresponding with an aspect ratio of 20 to 1, diameter-to-length, then the condition schematically portrayed obtains. In this regard, note that those components of flow represented by arrows 90a–90d are seen to concentrate against the internal surface 92 of the extender portion 80. This, as before, creates a localized region of enhanced flow velocity which impinges upon the probe 86a. Where that probe is the heated one, then the representation provided by it will correspond to a sensed fluid velocity much greater than realistically corresponds with the velocity represented by the mass transport of flow. In this regard, the latter transport vector, as represented at enlarged arrow 94 corresponds again with the angle $\theta$ between the axis 84 of cavity 74 and the direction of incident fluid flow, herein represented at line 90c. For the instant condition, the probe 86b is a reference probe and the reading effected by it is one essentially unaltered with respect to measuring the reference temperature of impinging fluids.

Considering an opposite condition wherein probe 86a is designated as a reference probe, then heated probe 86b encounters a swirl of lower magnitude than experienced, for example, as discussed in FIG. 4 at 42e–42f and herein represented as arrows 90e and 90f. Note that there is represented a much lower velocity of fluid due to the shielding occasioned by the shroud extender 80 at its surface 96.

As before, another phenomenon occurs at the exit shroud extender 81 in that externally evolved turbulence will have a blocking effect on exiting fluids. For example, this turbulence is represented at 90g in the figure. Essentially the same defect of not properly responding to a cosine distribution in flow measurement are encountered for the variety of sensor components available in the marketplace, i.e. small turbine meters, strain bars, pilot tubes, and the like.

Referring to FIG. 8, a flow sensing array according to the invention is revealed generally at 100. The array 100 includes a base support 102 and cylindrical sensor supports 103–105 as before. These components are interlocked by threaded couplings as represented, respectively, at 106–108 and the end support 105 is shown having a sealed end wall 110. Each of the supports 103–105 is provided as a cylindrical cavity as respectively represented in general at 112–114. These cavities 112–114 are formed having shroud extender portions shown, respectively, at 116–121 of cylindrical shape and extending to both entrance and exit peripheries of cavities 112–114. It may be seen, however, that the extender portions, for example at 116, 118 and 120 are configured to support a partitioner assemblage, herein shown as a plurality of discrete cylindrically shaped conduits which are nestably positioned therein and represented respectively at 122, 124, and 126.

Referring additionally to FIG. 9, the resulting structure shown as that at support 105-cavity 114 provides a sampling conduit including shroud extender portions 120 and 121 operating in concert with an entrance flow partitioner 126 and an exit partitioner 127. The flow sensor probe components are represented in the figure at 130a and 130b. Note in the figure that a flow chamber as at 132 extends from the end of partitioner array 126 at 134 to the position of sensors 130a and 130b. Correspondingly, a flow chamber 136 extends from the latter probe components 130a and 130b to the entrance plane 138 of the exit partitioner array 127.

Turning to FIG. 10, the performance of the instant flow measuring configuration is considered in conjunction with a localized fluid front represented by flow vectors shown generally at 140. Those vectors representing the incident front of vectors 140 impinging upon the cavity 114 are represented by vector lines 140a–140d. It may be observed that these flow vectors, as represented by lines 140a–140d, fall within a sample incident front defined by dashed lines 142 and 144 encompassing a sample incident front area, A1 represented by bracket 146. Note, additionally, that the local vectors 140 again are seen to be at an angle $\theta$ with respect to the central axis 148 of cavity 114. Note further, as represented by dashed lines 150 and 152 extending to bracket 154 that the circular cross-section of cavity 114 has a sample acceptance area, A2, which is greater than the sample incident from area A1 represented at bracket 146. With the instant arrangement, the cavity 114, performing in conjunction with the array of entrance flow partitioners or tubular conduits 126, functions to alter the direction of the incident front encompassed within the region of bracket 146 such that the flow vector direction exiting from partitioners 126 and within the flow chamber 132 is uniform and impinges in that condition against the sensor probes 130a and 130b. The velocity of the flow impinging upon the sensor probes 130a and 103b is of lesser extent than that of the incident front represented within bracket 146 and, in effect, represents a diminution in velocity corresponding with the cosine of the incident angle $\theta$. For the embodiment shown, the flow chamber 132 extending from the end plane of partitioner array 126 to the location of sensors 130a and 130b functions to derive a substantially uniform profile of velocity of the sampled fluid flow as that flow reaches the position of the probes 130a and 130b. The extent of chamber 132 may be diminished essentially to a zero valuation depending upon the installation at hand and the fluid flow being evaluated. Where the fluid exiting from the partitioners 126, even though somewhat perturbed, still exhibits a consistent flow pattern, then the chamber 132 may be eliminated and calibration may take place with this consistent but perturbed flow pattern. However, the instant architecture will be found to be that more commonly applicable in field installations.

Generally, the length of the entrance partitioner from its entrance to end plane thereof is selected as an effective multiple of the equivalent diameter or principal (larger) cross-sectional dimension of the internested partitioner conduits forming the partitioner. A 4:1 length to diameter or principal cross-sectional dimension ratio will provide an approximate maximum small angle error of three percent in the sensor's ability to extract the noted cosine component. In this regard, one may contemplate a simple screen being positioned at the entrance opening which, although suitable in reducing turbulence, will, because of its excessively small length to diameter ratio, not effectively alter the direction of fluid passing therethrough. For the opposite condition wherein very large length to diameter ratios, for example the earlier-noted 20:1 are contemplated, an axial alignment of fluid flow at the exit plane of the partitioner is guaranteed, however, the extracted velocity component would be significantly reduced in velocity due to the pressure drop across the length of partitioner. This pressure drop is essentially independent of the incident angle and its effect on measured output may be accommodated for at the time of instrument calibration. At the noted 4:1 ratio of length to diameter or principal cross-sectional dimension, portions of fluid entering the entrance partitioner can pass through it unperturbed with respect to axial alignment, up to an angle of about 14.0°, whereupon, for greater angles, all fluid would undergo direction change. The cosine of the noted 14.0° is 0.97. The measured output signal may not be properly modified to reflect a predicted 3% maximum possible reduction in fluid speed. Thus, while a 4:1 ratio as noted involves a 3% small angle error, for most applications this is acceptable. The examples disclosed later herein in conjunction with FIGS. 11 and 12 will be seen to employ a ratio of about 6:1.

As noted earlier, the turbulences evolved at the exit side of the cavity as at 114, without some form of correction, may impose pressure fronts which adversely effect the accuracy of flow measurement. These pressure fronts may be accommodated for by the utilization of an exit partitioner array as at 127. With the arrangement shown, any perturbation at the exit side of the cavity 114 will be prevented from adversely affecting performance of the sensors by virtue of the partitioner 127, inasmuch as any rearwardly directed flow vectors due to turbulence are effectively reduced to dismissible magnitudes when impinging upon the resultant exit region of cavity 114.

Tests were carried out in conjunction with a sequence of sensing devices structured in the manner described in conjunction with FIGS. 1, 2, and 4; additionally in conjunction with sensors structured as described in conjunction with FIGS. 5-7 and, as developed in accordance with the teaching of the invention and shown in conjunction with FIGS. 8-10.

Looking to FIG. 11, an arrangement employed for carrying out such testing is illustrated in schematic fashion. The test arrangement represented in general at 160 included an elongate circular air duct 162 having a length of 11 feet and an internal diameter of 4 inches. The duct was supplied air from a 10 inch diameter radial air blower 164. A pitot tube represented schematically at 166 was positioned at the internal center and along the axis of duct 162 at a point therealong wherein the flow of air emanating from blower 164 exhibited a generally uniform velocity front. This location was about six feet downstream from the output of blower 164. Pitot tube 166 provided an output at a meter represented at 168 which indicated an output in velocity in feet per minute. A sensor mount as represented at 170 was positioned along the conduit 162 about 9 feet from the output of blower 164 and was mounted so as to be locatable and to locate the entrance cavity of flow sensors at the internal center of duct 162. The location of such flow sensors is represented in phantom at 172. The output of the sensors was conveyed by appropriate cabling 174 to treatment circuitry and display apparatus as represented at 176 and as described in the above-referenced U.S. Pat. No. 4,255,968. Each of the noted sensor structures was initially positioned such that the axis thereof was aligned with the axis of duct 162. Readings were taken for this ideal geometry and, the sensors then were rotated through orientations of 90° in either direction as represented by arrow 178 and the resultant output was recorded from the readout of the apparatus represented at 176. Constant velocity flow was maintained along the conduit 162 throughout this measurement as monitored by the pitot tube 166-readout 168. The sensor 172 used in the test was configured so as to be convertible from one structure to another for purposes of developing those devised geometries discussed above. In particular, a sensor corresponding with FIGS. 1, 2, and 4 was provided having a cavity length of one inch with the probe, for example as described at 30a and 30b being positioned at the center thereof. The internal diameter of the probe was 9/16 in.

The sensor employed for developing data corresponding with the structure of FIGS. 5-7 utilized the same 9/16 in. diameter cavity structure in conjunction with two ¾ inch long cylindrical shroud extenders of the same internal diameter. Finally, data compiled in conjunction with the structure according to the invention as described in conjunction with FIGS. 8-10 utilize the above 9/16 in. internal diameter cavity and ¾ inch long shroud extenders in conjunction with an array of ¾ in.

long, ⅛ in. plastic tubes packed within the entrance and exit shroud extenders. This configuration represents a length-to-principal dimension ratio of about 6:1. For the latter embodiment, a ½ in. chamber as discussed at 132 and 136 in FIG. 10 was developed.

Figure 12:
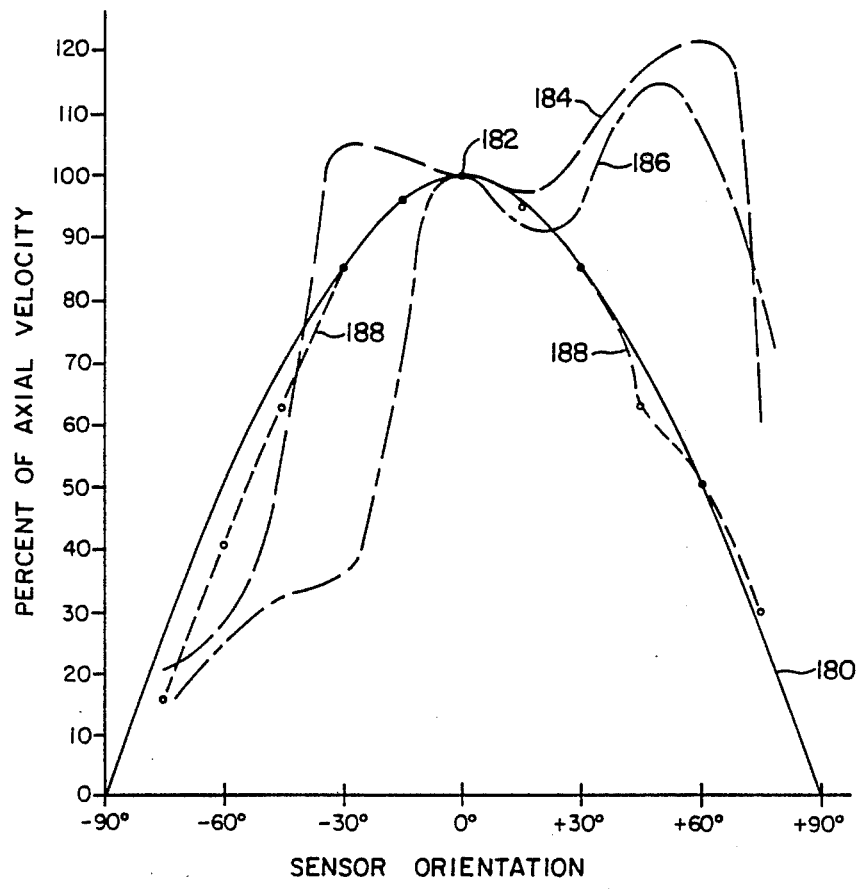
FIG. 12 is a graphical representation of data developed in conjunction with the experimental arrangement shown in FIG. 11 as well as in conjunction with an idealized cosine distribution curve.

The results of the testing carried out with the arrangement described in conjunction with FIG. 11 are shown plotted in FIG. 12 in conjunction with an idealized readout for a "perfect" sensor as shown at curve 180. In the figure, the angular orientation of the sensor 172 is shown along the abcissa as moving in a plus rotational direction and a minus rotational direction from a control 0°. For such a curve, as represented by the vertical divisions shown thereon as percent of axial velocity, a perfect sensor will read 100 percent of axial velocity when the flow axis thereof is oriented in parallel with the axis of conduit 162 or as shown at position 182 on curve 180. As the ideal sensor then is rotated away from direct confrontation with the incident fluid front, then its readout will approach a zero percent of measured velocity as the device is turned perpendicularly to incident fluid flow. Of course, curve 180 is idealized and represents the earlier-noted cosine division of flow as the sensors are rotated before the test fluid front.

Dashed curve 184 provides a plot of readouts taken with sensor 172 constituted in the manner of that shown in FIGS. 1, 2, and 4. Curve 184 represents a confronting geometry wherein the probe 30a of FIG. 4 is the heated one for positive angles of −0 °. Data points were taken at each 15° and, as the sensor 172 for this investigation was rotated in a positive direction, data points being taken each 15°, the percent of axial velocity is seen to elevate in consonance with the description provided in conjunction with FIG. 4. This elevation of velocity readout continues until the sensor reaches a positive angular orientation of about 75°, whereupon the side of the sensor as represented, for example, by surface 56, became a shield and a rapid drop-off in indicated velocity ensues, as shown by curve 184. Where the sensor was rotated in an opposite rotational sense, as represented in negative angle fashion in FIG. 12, then a slight rise in velocity is witnessed due to the earlier-described additive disturbance phenomena coming over the edge of the sensing cavity. Beyond about −30°, the readings are seen to drop sharply, again due to shielding conditions impose by the walls of the sensing cavity.

Curve 186 provides a plot of readouts, again taken at 15° intervals, for a sensor arrangement as described in conjunction with FIGS. 5-7. As the sensor under test was rotated in the indicated positive rotational direction, a slight decrease in indicated velocity initially is shown through an angle of about 20° due to initial shielding of schroud extender surface 80. The curve then is seen to rapidly elevate in indication of velocity until a sensor axis angle of about 50° is reached due to velocity increase along the cavity wall at the heated probe. A sharp drop-off then ensues as noted earlier. The effect represented by the curve is essentially identical to that discussed above in conjunction with curve 184. Where the sensor under test was rotated in an indicated negative direction, then essentially a sudden drop-off occurs as a result of shielding by the shroud extenders, the edge of the confronting shroud extension essentially blocking the passage of air against the heated probe component.

The increase otherwise observed in conjunction with curve 184 is not seen in conjunction with curve 186 for this rotation due to the noted shroud extension shielding effect, i.e. distance to the point of interception with fluid flow and source of disturbance.

Curve 188 in FIG. 12 represents a plot at 15° intervals taken with a sensor structure described in conjunction with FIGS. 8-10. Note that the curve follows the ideal curve 180 closely. This indicates that the flow partitioners perform the noted sampled incident front. Thus, sensors configured in accordance with the teachings of the invention are capable of identifying and accurately evaluating the velocity of an incident fluid front notwithstanding any of significantly broad variations of the incident angle described herein as $\theta$.

Looking to FIG. 13, another arrangement for the function of the entrance and exit partitioners employed with the sensor of the invention is revealed in general at 190. The structure 190 includes the earlier-noted shroud extender 192 and a grid or rectangular array of partitions represented at 194. Conventional honeycomb products are well suited for the partitioner function. Generally, the honeycomb portions will exhibit a hexagonal cross-sectional configuration.

FIG. 14 reveals still another partitioner structure in general at 196 as including a shroud extender 198 and an array 200 of thin vanes. In general, the grid array 194 (FIG. 13) or the vane array 200 will have a length selected for carrying out the partitioning function, for example, the ¾ in. length as discussed in conjunction with the evaluation discussed in relation to FIGS. 11 and 12.

As is apparent, the partitioning structure emloyed according to the invention will find application to a wide variety of flow sensors, e.g. pitot tubes, turbines, targets, and the like. It should be noted that although the invention is described to have a cylindrical shape for the extenders and cavity this is not limiting. Any shape is applicable which includes a square, rectangle, elipse and elongated circle, to name a few.

The directional aspects of the sensor developed in accordance with the teaching of the invention has further application in evaluating fluid flow direction. In this regard, the sensors may be employed with directional flow devices. Looking to FIG. 15, such an embodiment is described in conjunction with the elongate hand-held probe 202. Probe 202 is seen to include a sensor structure 204 which incorporates a centrally-disposed cavity (not shown) lying within shroud extender portions 206 and 208 structured, for example, as described in conjunction with FIG. 10. In the latter regard, an array of partitioner tubes 210 is shown located within the shroud extension 206. A similar grouping of exit partitioners is included within the extension 208. Leads to the probes within structure 204 pass through an elongate supporting rod 212 and are seen to extend as a cable 214 from a hand-graspable handle 216. With the arrangement shown, the structure 202 may be hand positioned within the region of flow evaluation and manipulated until, for example, a maximum output is read, whereupon the orientation of the component 204 is noted to, in turn, determine the orientation of the sensed flow velocity vector. The probe 202, for example, finds use in evaluating a flow within large stacks, circulating tanks, dryers and the like. The probe of the invention, of course, finds application in fluid both of the gaseous and liquid variety.

Returning momentarily to FIG. 1, the sensor array 10 is seen to be structured such that individual support segments as at 13-15 are threadably coupled together and the probe structures are permanently affixed therein. In some applications, the individual segments are welded together on a permanent basis. With either such arrangement, maintenance of the probes becomes an involved procedure, the probe devices themselves being difficult or impossible to remove from an array, particularly in the field. Further, where threaded couplings as at 16-18 are employed, the necessary twisting of these components leads to difficulties for maintenance personnel in the consequent twisting of leads and the like.

Looking to FIGS. 16 and 17, an improved mounting arrangement for the sensing devices is shown in general at 220. Here, a segment of cylindrical supporting rod or conduit is shown at 222 as carrying communicating electrical leads, for example, as represented at 224 and 226. A sensor is represented generally at 228 supported from support 222. In this regard, looking additionally to FIG. 17, the sensor 228 is seen to include a centrally disposed cylindrical cavity 230 carrying probes 232 and 234. Probe 232 may be considered a heated probe and, includes the component 236 thereof being a heater and the attached temperature sensor 238 evaluating the thermal characteristics thereof. Correspondingly, the probe assembly 234 includes a thermal transient balancing inert support 240 operating in conjunction with a reference temperature sensor 242. Shroud extenders are provided at 244 and 246 and are provided as a continuum of the internal sidewall structure of cavity 230. Extender 244 is seen to incorporate an array of tubular partitioners repesented at 248, while shroud extension 246 incorporates a similar array of tubular partitioners 250.

Returning to FIG. 16, the sensor 228 is seen to be supported at its central position by an upstanding cylindrical base 252 into which lead 226 is seen to extend for communication with the probe structures 232 and 234 of FIG. 17. Connection with the support 222 is provided by a removable connective structure including a boss 254 which is externally threaded at 256 and which is welded about the periphery of an opening 258 made within support 222. Boss 254 further is configured having a rectangularly shaped alignment projection 260 weldably affixed to the inside surface thereof. This projection 260 is configured such that a corresponding slot cut into the cylindrical base 252 slides thereover upon mounting to assure alignment of the axis of the sensor 228 in perpendicular relationship with the axis of the support 222. Cylindrical base 252 is removably retained in position by an internally threaded cap 262 and an O-ring 264. Cap 262 is formed having a closely conforming circular opening therein through which the base 252 is slideable in close adjacency. Thus, as the cap 262 is tightened downwardly, the resultant pressure against O-ring 264 secures the sensor-base 252 in appropriate orientation while providing a necessary seal preventing migration of contaminants into the center of support 222.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. Apparatus for determining the mass transport of fluid within a conduit, said fluid having a mass transport vector along the axis of said conduit, said mass transport vector being derived from localized components of fluid flow each exhibiting a local flow velocity vector, comprising:

sampling conduit means having a flow axis, positioned within said conduit and having an entrance opening of area extent selected to confront and sample an incident front area of fluid representing a said localized component of fluid flow and said component of fluid flow exhibiting a said local flow velocity vector incident to said flow axis at an angle $\theta$, for admitting that portion of said component as sampled fluid flow;

entrance partitioner means comprising a plurality of conduits positioned within said sampling conduit means, each having a principal cross-sectional dimension, and extending therein a predetermined length from said entrance opening to an end location, said predetermined length being selected as a multiple of said principal dimension effective to intercept discrete portions of said component of fluid flow and alter the direction of flow thereof to a direction substantially parallel with said sampling conduit means flow axis and exhibiting a velocity substantially corresponding with the product of said local flow velocity vector and the cosine of said angle $\theta$;

flow sensor means mounted with said sampling conduit means and responsive to said sampled fluid flow for deriving an output signal corresponding therewith; and means defining a flow chamber intermediate said flow sensor means and said entrance partitioner means end location for effecting the derivation of a substantially uniform profile of velocity of said sampled fluid flow at said flow sensor means.

2. The apparatus of claim 1 in which said entrance partitioner means predetermined length is about four times said principal dimension of said conduits thereof.

3. The apparatus of claim 1 including exit partitioner means positioned within said sampling conduit means downstream from said flow sensor means for preventing interference to said sampled fluid flow deriving from dynamic phenomena within said region of fluid movement external to said sampling conduit means.

4. The apparatus of claim 3 in which said exit partitioner means comprises a plurality of conduits having hexagonal cross-sections.

5. The apparatus of claim 3 in which said exit partitioner means comprises a plurality of conduits formed as cylindrical tubes.

6. The apparatus of claim 1 in which said entrance partitioner means discrete conduits comprise a sequence of parallel flat vanes.

7. The apparatus of claim 1 in which said entrance partitioner means discrete conduits comprise a plurality of internested said conduits having rectangular cross sections.

8. The apparatus of claim 1 in which said entrance partitioner means discrete conduits comprise a plurality of internested cylindrical tubes.

9. The apparatus of claim 1 in which said entrance partitioner means conduits comprise a plurality of internested said conduits having hexagonal cross-sections.

10. The apparatus of claim 1 in which said sensor means comprises:

first probe means extending within said sampling channel at said predetermined location;

first thermally responsive sensor means mounted with said first probe means for deriving a first signal representing the thermal condition of said sensor means as influenced by said sample flow;

heater means mounted with said first probe means for thermally influencing said first thermally responsive sensor means in a manner wherein the residual temperature deriving said thermal influence varies as an exponential relationship between said first sensor means and said heater means;

second probe means extending within said sampling channel at said predetermined location and spaced from said first probe means;

second thermally responsive sensor means mounted with said second probe means for deriving a reference output signal representing a thermal condition of said sample flow; and comparison means responsive to said reference output signal and said first signal for deriving an output representing the rate of flow of said sample flow.

11. Flow sensor apparatus positionable within a conduit carrying fluid moving therewithin along a mass transport axis and exhibiting localized components of flow having velocity vectors at angles $\theta$ incident to said transport axis, comprising:

sampling conduit means having an entrance opening of area extent selected to confront a said localized component of flow, having a sampling channel defining a flow axis parallel with said mass transport axis extending to an exit opening and configured for developing a sample flow at a predetermined location within said sampling channel;

entrance partitioner means having a plurality of conduits each having a principal cross-sectional dimension positioned within said sampling channel and extending a predetermined length selected as a multiple of said principal dimension effective to intercept discrete portions of said localized component of flow and alter the direction thereof to a direction substantially parallel with said flow axis and exhibiting a flow velocity corresponding with the product of said localized component velocity vector incident upon said entrance opening and the cosine of its said angle $\theta$; and flow sensor means positioned within said sampling channel at said predetermined location and responsive to said fluid sample flow thereat for deriving an output signal corresponding therewith.

12. The flow sensor of claim 11 including means defining a flow chamber extending between said sampling channel predetermined location and said entrance partitioner means end location for effecting the derivation of a substantially uniform profile of velocity of fluid flowing at said sensor means.

13. The flow sensor of claim 11 in which said entrance partitioner means discrete conduits comprise a sequence of parallel flat vanes.

14. The flow sensor of claim 11 in which said entrance partitioner means discrete conduits comprise a plurality of internested said conduits having rectangular cross sections.

15. The flow sensor of claim 11 in which said entrance partitioner means discrete conduits comprise a plurality of internested said conduits having hexagonal cross-sections.

16. The flow sensor of claim 11 in which said entrance partitioner means discrete conduits comprise a plurality of internested cylindrical tubes.

17. The flow sensor of claim 11 including exit partitioner means positioned within said sampling channel and extending from said exit opening a predetermined distance toward said predetermined location for preventing interference to said sample flow deriving from dynamic flow phenomena within said conduit carrying fluid external to said sampling conduit means.

18. The flow sensor of claim 17 in which said exit partitioner means comprises a plurality of conduits having hexagonal cross-sections.

19. The flow sensor of claim 17 in which said exit partitioner means are formed as a plurality of cylindrical tubes.

20. The flow sensor of claim 11 in which said sensor means comprises:

first probe means extending within said sampling channel at said predetermined location;

first thermally responsive sensor means mounted with said first probe means for deriving a first signal representing the thermal condition of said sensor means as influenced by said sample flow;

heater means mounted with said first probe means for thermally influencing said first thermally responsive sensor means in a manner wherein the residual temperature deriving said thermal influence varies as an exponential relationship between said first sensor means and said heater means;

second probe means extending within said sampling channel at said predetermined location and spaced from said first probe means;

second thermally responsive sensor means mounted with said second probe means for deriving a reference output signal representing a thermal condition of said sample flow; and comparison means responsive to said reference output signal and said first signal for deriving an output representing the rate of flow of said sample flow.

21. The method for determining the mass transport of fluid flowing within a conduit and having a mass transport vector along the axis of said conduit, said mass transport vector being derived from localized components of fluid flow, each exhibiting a local flow velocity vector at an angle $\theta$ with respect to said conduit axis, comprising the steps of:

providing a sampling conduit having an entrance opening of area extent selected to confront and define a said localized component of said fluid flow exhibting substantially uniform local flow velocity, and having a sampling channel extending along a channel axis from said entrance opening to an exit opening;

positioning said sampling conduit to intercept said localized fluid flow and in an orientation wherein said channel axis is parallel with said conduit axis;

partitioning said intercepted fluid flow upon the entry thereof through said entrance opening by locating a plurality of partitioning conduits within said sampling conduit, each said partitioning conduit having a principal cross-sectional dimension and intercepting a discrete portion of said intercepted fluid flow and each partitioning conduit extending from said entrance opening to an end location representing a length selected as a multiple of said principal dimension effective to derive a fluid flow exhibiting a flow vector substantially parallel with said sampling axis and having a sampled flow velocity vector of magnitude corresponding with the product of said local flow velocity vector and the cosine of said angle θ;

positioning a flow sensor within said sampling channel at a location to measure said fluid flow having said sampled flow velocity vector, said location being spaced from said end location of said partitioning conduits to define a flow chamber of extent deriving a substantially uniform profile of velocity of said intercepted fluid flow at said flow sensor; and deriving a flow velocity output from said positioned flow sensor.

22. The method of claim 21 including the steps of:
providing an exit partitioner extending into said sampling channel from said exit opening for preventing interference to fluid flow at said flow sensor location deriving from dynamic flow phenomena external to said sampling conduit in the vicinity of said exit opening.

23. Apparatus for detecting the direction of a localized component of fluid flow within a region of movement of said fluid, comprising:
a positioning rod having an end positionable within said region of fluid movement;
sampling conduit means mounted to have a predetermined orientation at said rod end and movable therewith for positioning within said localized component of fluid flow and having an entrance opening of select area extent, a sampling channel defining a flow axis corresponding with said predetermined orientation extending to an exit opening and configured for developing a sample flow at a predetermined location within said sampling channel;
entrance partitioner means comprising a plurality of conduits, each having a principal cross-sectional dimension, positioned within said sampling channel and extending therein a predetermined length from said entrance opening to an end location, said predetermined length being selected as a multiple of said principal dimension effective to intercept discrete portions of said localized component of fluid flow and alter the direction of flow thereof to a direction substantially parallel with said sampling channel flow axis and having a flow velocity corresponding with the product of the vector of flow velocity of said localized component incident upon said entrance opening and the cosine of said angle of incidence with respect to said sampling channel flow axis;
flow sensor means poistioned within said sampling channel at said predetermined location and responsive to said fluid sample flow thereat for deriving an output signal corresponding therewith;
means defining a flow chamber extending between said sampling channel predetermined location and said entrance partitioner means end location for effecting the derivation of a substantially uniform profile of velocity of fluid flowing at said sensor means; and
manipulative means for effecting the movement of said positioning rod to maneuver said sampling conduit means into a position wherein the value of said cosine approaches unity and for determining the orientation of said vector of said flow velocity at said position.

24. The flow sensor of claim 23 in which said entrance partitioner means discrete conduits comprise a plurality of internested said conduits having hexagonal cross-sections.

25. The flow sensor of claim 23 including exit partitioner means positioned within said sampling channel and extending from said exit opening a predetermined distance toward said predetermined location for preventing interference to said sample flow deriving from dynamic flow phenomena within said conduit carrying fluid external to said sampling conduit means.

26. The flow sensor of claim 25 in which said exit partitioner means comprises a plurality of conduits positioned within said sampling channel and having hexagonal cross-sections.

27. A flow sensor assembly for positioning within a region of fluid flow, comprising:
a sensor support mountable within said region of fluid flow, having an external surface, an internally disposed conduit extending along a support axis for protectively supporting electrical leads and selectively positioned conduit opening communicating with said conduit through said surface;
an annular, externally threaded mount having a base fixed to said support external surface, a top surface, a centrally disposed cylindrical surface opening extending from said top surface therethrough and positioned over said conduit opening;
a cylindrical sampling conduit support slideably insertable within said mount cylindrically surface opening, supportable therefrom, and having internally disposed channel means for effecting access with said sensor support conduit through said conduit opening;
sampling conduit means for sampling a localized component of said fluid flow along a sampling flow axis, said sampling conduit means being mounted upon and supported by said cylindrical sampling conduit support;
flow sensor means mounted within said sampling conduit means and responsive to said sampled fluid flow for deriving an output signal corresponding therewith at electrical output leads extensible through said internally disposed channel means and said sensor support internally disposed conduit for readout access without said region of fluid flow;
compliant sealing means positioned at said mount top surface in contact with said cylindrical conduit support;
an annular, internally threaded retainer cap theadably engageable with said externally threaded mount and slideably positionable about said cylindrical sampling conduit support for effecting the retention thereof within said annular mount by compressible engagement with said compliant sealing means.

28. The flow sensor assembly of claim 27 in which said compliant means is an O-ring.

29. The flow sensor assembly of claim 27 in which:
said annular externally threaded mount includes an alignment insert extending inwardly from said centrally disposed opening; and
said cylindrical sampling conduit support is configured having a slot slidable over and engageable with said alignment insert for securing said conduit support against rotation.

30. The flow sensor assembly of claim 27 in which said sampling conduit means includes an entrance opening of area extent selected to confront said localized component of said fluid flow impinging thereon at a given angle of incidence, and having a sampling channel extending along said sampling flow axis to an exit opening and configured for developing a sample flow at a predetermined location within said sampling channel having a flow velocity corresponding with the product of the flow velocity of said localized component and the cosine of said angle of incidence; and said flow sensor means is mounted at said predetermined location.

31. The flow sensor assembly of claim 30 including entrance partitioner means positioned within said sampling channel and extending a predetermined length therein from said entrance opening to an end location for intercepting discrete portions of said localized component of flow and altering the direction thereof to a direction substantially parallel with said flow axis.

32. The flow sensor of claim 31 including means defining a flow chamber extending between said sampling channel predetermined location and said entrance partitioner means end location for effecting the derivation of a substantially uniform profile of velocity of fluid flowing at said sensor means.

33. The flow sensor of claim 31 including exit partitioner means positioned within said sampling conduit means downstream from said flow sensor means for preventing interference to said sampled fluid flow deriving from dynamic phenomena within said region of fluid movement external to said sampling conduit means.

34. Apparatus for detecting the direction of a localized component of flow within a region of movement of said fluid, comprising:

a positioning rod having an end positionable within said region of fluid movement;

sampling conduit means mounted to have a predetermined orientation at said rod end and movable therewith for positioning within said localized component of fluid flow and having an entrance opening of select area extent, a sampling channel defining a flow axis corresponding with said predetermined orientation extending to an exit opening and configured for developing a sample flow at a predetermined location within said sampling channel;

entrance partitioner means comprising a plurality of conduits, each having a principal cross-sectional dimension, positioned within said sampling channel and extending therein a predetermined length from said entrance opening to an end location, said predetermined length being selected as about four times said principal dimension for intercepting discrete portions of said localized component of fluid flow and altering the direction of flow thereof to a direction substantially parallel with said sampling channel flow axis and having a flow velocity corresponding with the product of the vector of flow velocity of said localized component incident upon said entrance opening and the cosine of said angle of incidence with respect to said sampling channel flow axis;

flow sensor means positioned within said sampling channel at said predetermined location and responsive to said fluid sample flow thereat for deriving an output signal corresponding therewith;

means defining a flow chamber extending between said sampling channel predetermined location and said entrance partitioner means end location for effecting the derivation of a substantially uniform profile of velocity of fluid flowing at said sensor means; and manipulative means for effecting the movement of said positioning rod to maneuver said sampling conduit means into a position wherein the value of said cosine approaches unity and for determining the orientation of said vector of said flow velocity at said position.

35. Flow sensor apparatus positionable within a conduit carrying fluid moving therewithin along a mass transport axis and exhibiting localized components of flow having velocity vectors at angle $\theta$ incident to said transport axis, comprising:

sampling conduit means having an entrance opening of area extent selected to confront a said localized component of flow, having a sampling channel defining a flow axis parallel with said mass transport axis, extending to an exit opening and configured for developing a sample flow at a predetermined location within said sampling channel;

entrance partitioner means having a plurality of conduits each having a principal cross-sectional dimension positioned within said sampling channel and extending a predetermined length of about four times said principal dimension for intercepting discrete portions of said localized component of flow and altering the direction thereof to a direction substantially parallel with said flow axis and exhibiting a flow velocity corresponding with the product of said localized component velocity vector incident upon said entrance opening and the cosine of said incident angle, $\theta$; and flow sensor means positioned within said sampling channel at said predetermined location and responsive to said fluid sample flow thereat for deriving an output signal corresponding therewith.

36. Apparatus for determining the mass transport of fluid within a conduit, said fluid having a mass transport vector along the axis of said conduit, said mass transport vector being derived from localized components of fluid flow, each exhibiting a local flow velocity vector, comprising:

sampling conduit means having a flow axis positioned within said conduit and having an entrance opening of area extent selected to confront and sample an incident front area of fluid representing a said localized component of fluid flow and said component of fluid flow exhibiting a said local flow velocity vector incident to said flow axis at an angle, $\theta$, for admitting that portion of said component as sampled fluid flow;

entrance partitioner means comprising a plurality of conduits positioned within said sampling conduit means, each having a principal cross-sectional dimension, and extending therein a predetermined length from said entrance opening to an end location, said predetermined length being about four times said principal dimension, for intercepting discrete portions of said component of fluid flow and altering the direction of flow thereof to a direction substantially parallel with said sampling conduit means flow axis and exhibiting a velocity substantially corresponding with the product of said local flow velocity vector and the cosine of said angle $\theta$;

flow sensor means mounted with said sampling conduit means and responsive to said sampled fluid flow for deriving an output signal corresponding therewith; and means defining a flow chamber intermediate said flow sensor means and said entrance partitioner means and the location for effecting the derivation of a substantially uniform profile of velocity of said sampled fluid flow at said sensor means.

* * * * *